UNITED STATES PATENT OFFICE.

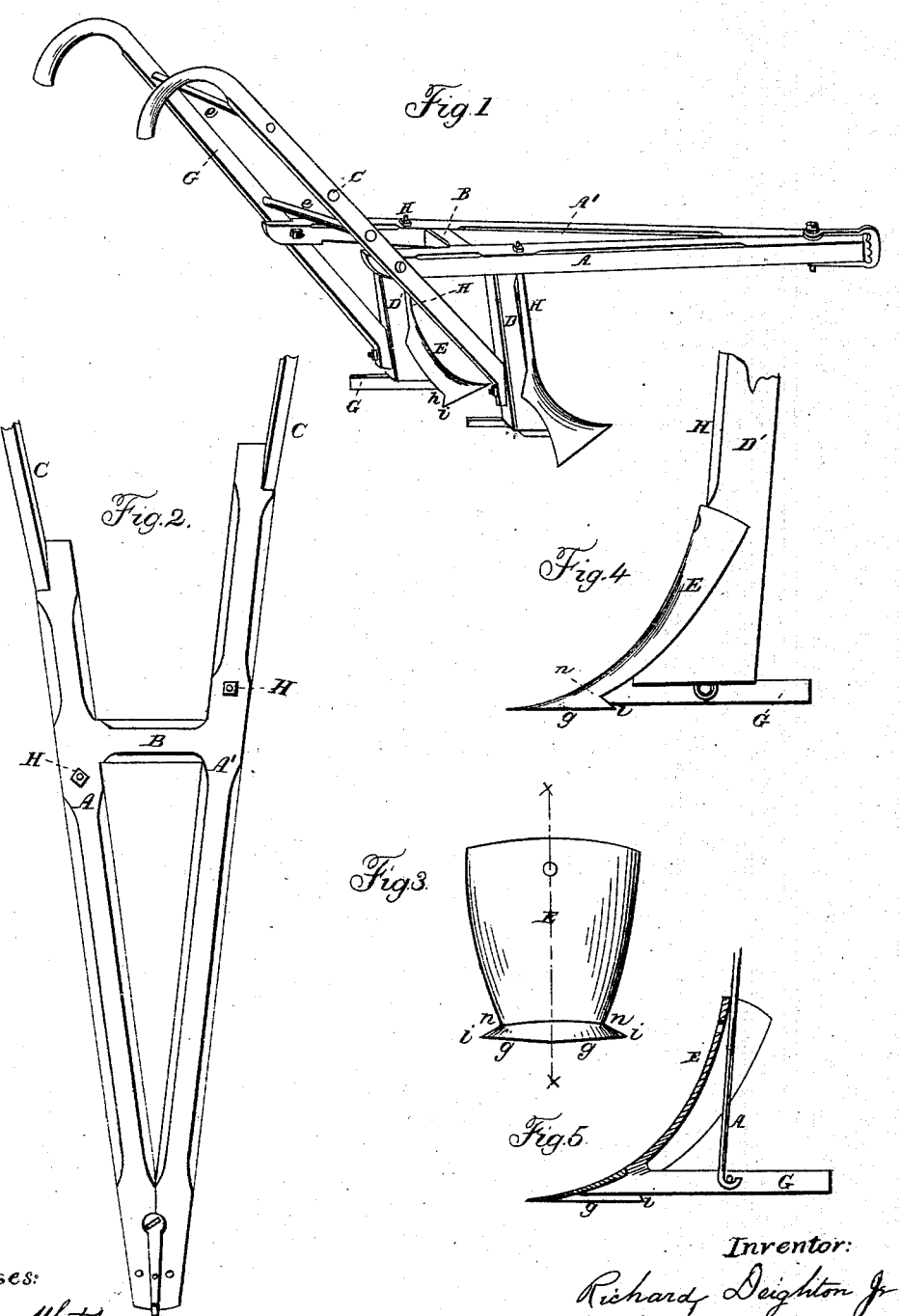

RICHARD DEIGHTON, JR., OF FAIRWEATHER, ILLINOIS.

IMPROVEMENT IN PLOWS.

Specification forming part of Letters Patent No. 49,389, dated August 15, 1865.

*To all whom it may concern:*

Be it known that I, RICHARD DEIGHTON, Jr., of Fairweather, in the county of Adams and State of Illinois, have invented certain Improvements in Plows; and I do hereby declare the following to be a full, clear, and exact description of the same, reference being had to the accompanying drawings and the letters of reference marked thereon.

Figure 1 is a perspective view of my plow. Fig. 2 is a plan view of the same, showing the double beam, &c. Fig. 3 is a front view of the shovel of my plow. Fig. 4 is a side elevation of the same. Fig. 5 is a vertical longitudinal section of the shovel, taken on a line $xx$ of Fig. 3.

The nature of my invention consists, first, in the construction of the beam and attachment of the handles, whereby the strength of plow is much increased in proportion to the amount of material used; second, in the form of the shovel, whereby the bottom of the furrow opened is flat, and may also be of greater width than the width of that portion of the earth thrown up and over by the shovel-board; third, in the construction of the shovel, with a horizontal bar from its lower side running backward and resting upon the bottom of the furrow, whereby the shovel is rendered steady and uniform in its operation.

That others may be enabled to understand the construction and operation of my invention, I will particularly describe it.

As is shown in Figs. 1 and 2, the plow-beam is constructed of two parts, A and A', one of which is somewhat longer than the other. They are joined and securely fastened together at their front ends, but diverge slightly, as represented. Near their rear ends they are joined by a cross-bar, B, framed into them. At their rear ends they are respectively fastened securely to the plow-handles C C, as clearly shown in Figs. 1 and 2.

From the under sides of the beams A and A' depend the posts D D', to which the plows are attached, and which are further braced and strengthened by the lower ends of the handles C C, which are secured to them, by bolts or other means, near their lower ends. The plow-handles are stiffened and supported by the usual rounds, $e\ e$.

By this means of construction it is obvious that as much strength is secured as the materials used are capable of possessing, and it also follows that an equal amount of strength is secured with a less amount of material than can be secured by any other manner of framing, so that a greater degree of lightness also follows, which is of itself a desideratum. The post D, being suspended from the lower side of the shorter beam A, is placed farther forward than the post D', as it is not desirable that the two plows should be opposite to each other. The front end of the beam is provided with the ordinary clevis, to be used in the common way, to give the plows a greater or less depth of draft, as may be desired, on account of the condition of the soil or the purpose of the plowing.

The shovel E is of peculiar form, and is so constructed as to cut a flat-bottomed furrow similar to the furrow cut by the ordinary plow. To accomplish this purpose I bend the point of the shovel forward rather more than common, so as to make the profile of the shovel more concave than is usually seen. (See Fig. 4.) I also expand that part of the shovel back of the point, so as to allow me to trim those edges in such a way that in profile they shall present a flat or horizontal straight edge, as at $g$, Fig. 4. In order to conveniently secure this flat expanse or share-edge, and at the same time preserve the convexity peculiar to the shovel-plow, it is necessary to indent the edges of the shovel somewhat in the manner shown at $h$, Figs. 3 and 4. The points $i$ then cut a little wider than the shovel-board E, which allows the said board to lift and turn the broken earth with greater ease, and therefore with less power, than when the ordinary plow, doing the same work, is used.

The unsteadiness of the shovel-plow has always been an objection against it, as it required more skill to use it efficiently than was required with an ordinary landside-plow of similar power. By the addition of a bar, G, which may be considered as corresponding to the landside of the common plow, the unsteadiness spoken of is obviated entirely. The bar G is secured to the shovel-share on its under side just back of the point, and corresponds in length to the ordinary landside. Its lower edge rests upon and runs on the bottom of the furrow, and operates in controlling the action of the share exactly as the landside does with the common plow.

In attaching the shovel to the plow-frame a bolt is passed through the shovel-board post D' and lower end of the handle C, and is secured by a nut, thus receiving the whole. Another bolt or rod, H, passes down through the beam A or A', immediately in front of the post D or D', and, its lower end being bent like a hook, clasps a pin which projects from the side of the landside, so that as the nut on the upper end of this latter bolt is tightened the landside or bar G is drawn up firmly in contact with the lower end of the post D or D', and the plow is held securely in its place, while at the same time it may be readily removed for the purpose of repairs or otherwise. These are the means of securing the plow to the frame which I exhibit in my application; but it is obvious that these means may be varied to suit the convenience or taste of manufacturers.

The operation and advantages of my invention may be briefly stated. Whether there be one or two shovel-plows attached to this frame the operation will be equally uniform. The form of shovel, the bar G, and the use of a clevis enable the plowman to run as deep as he desires, and the plow, owing to its two bearing-points, will run with perfect steadiness at all times, so that an unskilled hand, or even a boy, may manage it successfully.

Having described my invention, what I claim as new, and desire to secure by Letters Patent, is—

The plow-frame constructed of the two beams A and A', the cross-piece B, the posts D and D', and the handles C C, substantially as and for the purpose set forth.

RICHARD DEIGHTON, JR.

Witnesses:
ARTHUR CALLAHAN,
W. H. WATKINS.